(12) United States Patent
Zhang et al.

(10) Patent No.: US 8,070,345 B2
(45) Date of Patent: Dec. 6, 2011

(54) LIGHT GUIDE PLATES AND BACKLIGHT MODULE

(75) Inventors: He Zhang, Beijing (CN); Jun Zhu, Beijing (CN); Yan Zhao, Beijing (CN); Guo-Fan Jin, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 189 days.

(21) Appl. No.: 12/544,709

(22) Filed: Aug. 20, 2009

(65) Prior Publication Data

US 2010/0149787 A1 Jun. 17, 2010

(30) Foreign Application Priority Data

Dec. 12, 2008 (CN) .......................... 2008 1 0218192

(51) Int. Cl.
*F21V 7/04* (2006.01)
(52) U.S. Cl. ........................................ 362/619; 362/623
(58) Field of Classification Search .................. 362/617, 362/620, 619, 623, 628
See application file for complete search history.

(56) References Cited

U.S. PATENT DOCUMENTS

| | | | | |
|---|---|---|---|---|
| 7,025,482 | B2 * | 4/2006 | Yamashita et al. | 362/511 |
| 7,780,306 | B2 * | 8/2010 | Hoshi | 362/97.1 |
| 2003/0117790 | A1 * | 6/2003 | Lee et al. | 362/31 |
| 2005/0276566 | A1 * | 12/2005 | Iimura | 385/146 |
| 2006/0119751 | A1 * | 6/2006 | Suehiro et al. | 349/5 |
| 2007/0147073 | A1 * | 6/2007 | Sakai et al. | 362/607 |
| 2007/0171678 | A1 * | 7/2007 | Shim et al. | 362/616 |
| 2008/0117618 | A1 * | 5/2008 | Chen | 362/24 |
| 2008/0266901 | A1 * | 10/2008 | Chang | 362/618 |

FOREIGN PATENT DOCUMENTS

CN 1790129 6/2006

OTHER PUBLICATIONS

Shoji Kawamura, Capturing images with digital still cameras, Micro, IEEE vol. 18, issue:6,Nov.-Dec.1998 pp. 14-19.

* cited by examiner

*Primary Examiner* — Julie Shallenberger
(74) *Attorney, Agent, or Firm* — Altis Law Group, Inc.

(57) ABSTRACT

A light guide plate includes a body having a bottom surface and a light output surface opposite to the bottom surface. A reflector is located on the light output surface opposite to the center of the bottom surface. The reflector is a cavity concaved from the light output surface to the inside of the body. A plurality of scattering dots are located on the bottom surface. The scattering dots are arranged in the form of a plurality of concentric circles around the center of the bottom surface. The number of the scattering dots is defined based on a radius of the circle they reside on, and the radius of the circle is greater than or substantially equal to 4 millimeter.

18 Claims, 4 Drawing Sheets

LIGHT GUIDE PLATES AND BACKLIGHT MODULE

BACKGROUND

1. Technical Field

The present disclosure relates to light guide plates and backlight modules and, particularly, to a light guide plate for direct-type backlight module and a direct-type backlight module.

2. Description of Related Art

Currently, because liquid crystal displays (LCDs) are thin, lightweight, long lasting, and consume little power, they are extensively used in a variety of electronic devices. However, liquid crystal displays are not self-luminescent, therefore, backlight modules are typically required. Generally, backlight modules can be categorized as either direct-type backlight modules or edge-type backlight modules. Because direct-type backlight modules can provide high illumination in comparison with edge-type backlight modules, direct-type backlight modules are more widely employed in numerous applications.

Referring to FIG. 4, a direct-type backlight module 10, according to the prior art, is shown. The direct-type backlight module 10 includes a plurality of point light sources 11, a reflective plate 12, a light guide plate 13 and several layers of optical film (not labeled). The reflective plate 12 contains a plurality of through holes 120. Each through hole 120 corresponds to a point light source 11 and each point light source 11 extends through the corresponding through hole 120 to completely illuminate the light guide plate 13. A random number of scattering dots 130 are radially allocated on a surface of the light guide plate 13 with a central point opposite to the reflective plate 12. However, the light guide plate 13 usually is in square or rectangular form. Therefore, the light output from the light guide plate 13 is not uniform, thereby reducing the uniformity of illumination of the direct-type backlight module 10.

What is needed, therefore, is to provide a light guide plate that has improved uniformity of illumination and a direct-type backlight module using the same.

BRIEF DESCRIPTION OF THE DRAWINGS

Many aspects of the present light guide plate and direct-type backlight module can be better understood with reference to the following drawings. The components in the drawings are not necessarily drawn to scale, the emphasis instead being placed upon clearly illustrating the principles of the present light guide plate and direct-type backlight module.

Figure 1:
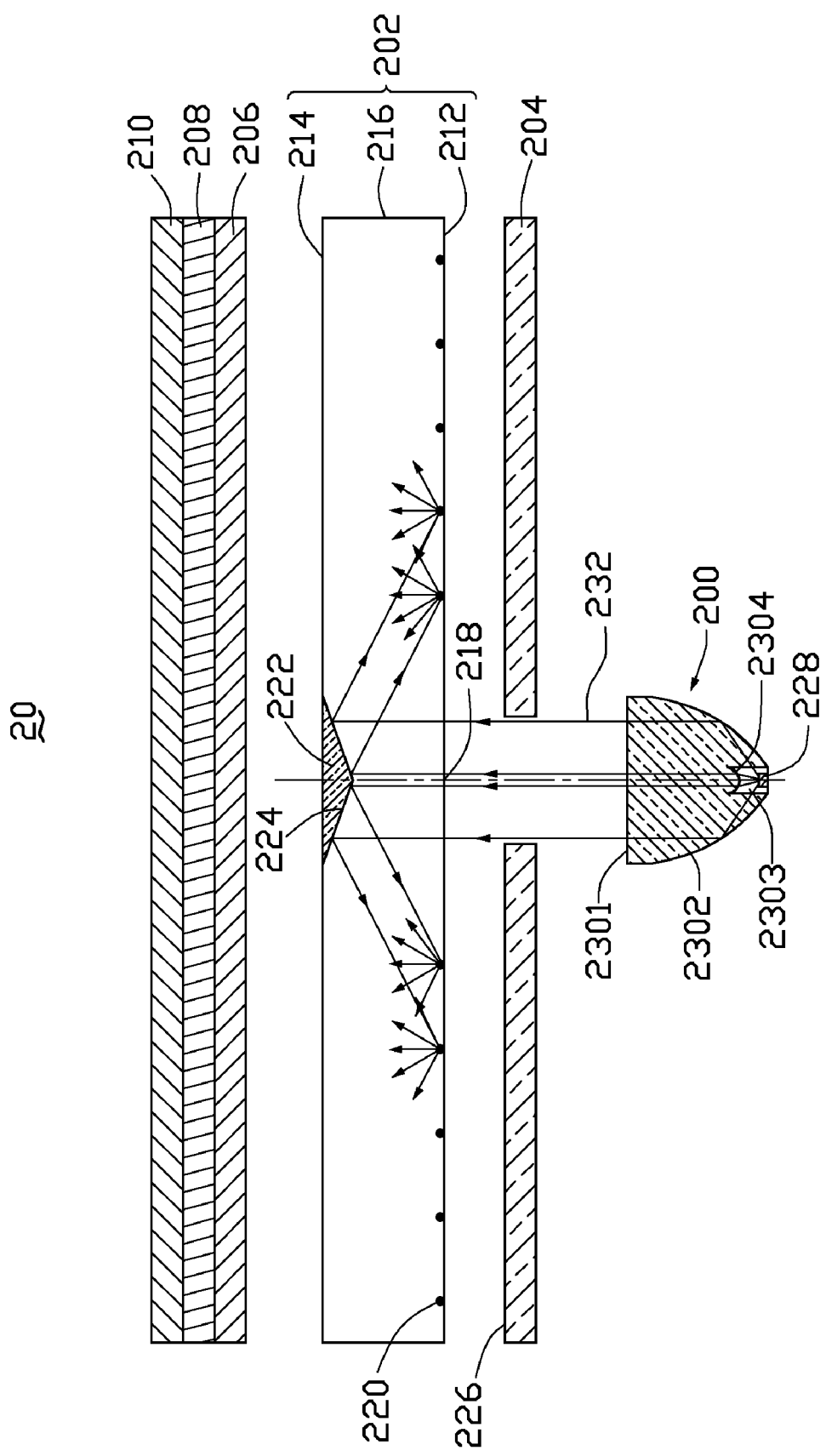
FIG. 1 is an exploded, cross-sectional view of a direct-type backlight module in accordance with one embodiment.

Corresponding reference characters indicate corresponding parts throughout the several views. The exemplifications set out herein illustrate at least one embodiment of the present light guide plate and direct-type backlight module, in at least one form, and such exemplifications are not to be construed as limiting the scope of the disclosure in any manner.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present light guide plate and direct-type backlight module.

Referring to FIG. 1, a direct-type backlight module 20 according to one embodiment is shown. The backlight module 20 includes a light source 200, a light guide plate 202, a reflective plate 204, a microprism plate 206, a polarization plate 208 and a diffusing plate 210.

The light guide plate 202 includes a body having a bottom surface 212, a light output surface 214 opposite to the bottom surface 212, and at least one lateral side 216. The bottom surface 212 has a center 218. The light source 200 is located adjacent to the bottom surface 212 and aligned with the center 218. The reflective plate 204 is located between the light source 200 and the bottom surface 212 of the light guide plate 202. The microprism plate 206, the polarization plate 208 and the diffusing plate 210 are located in sequence from bottom to top above the light output surface 214 of the light guide plate 202.

Figure 3:
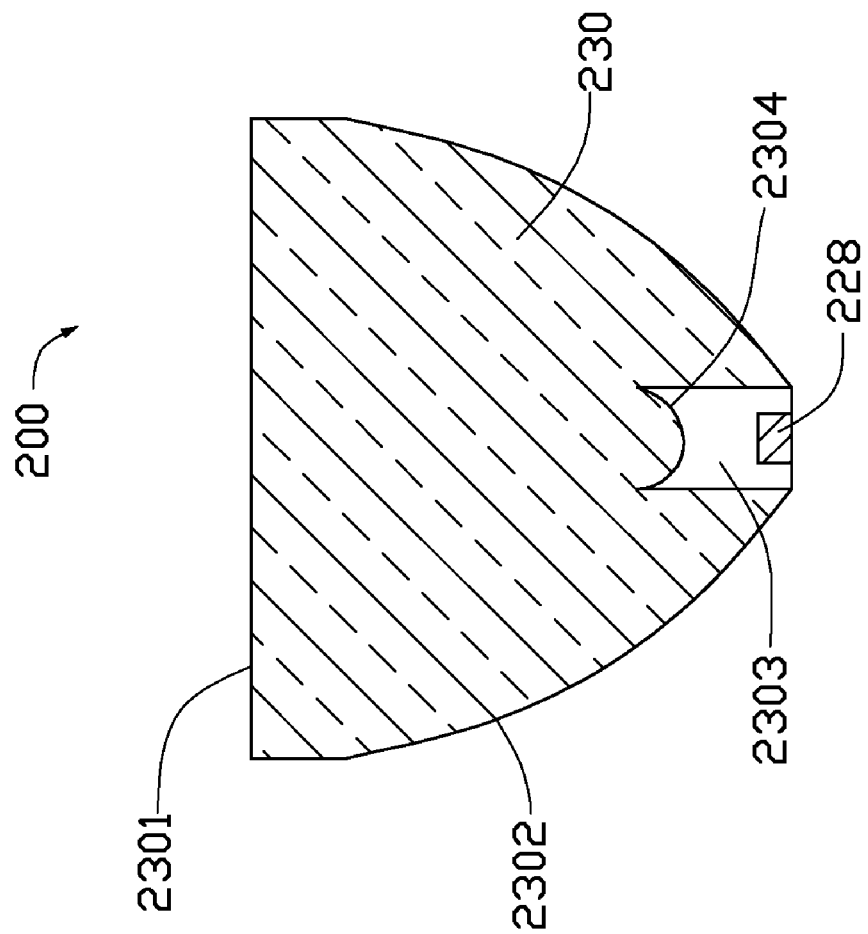
FIG. 3 is an enlarged schematic view of the light source of the direct-type backlight module of FIG. 1.
Figure 4:
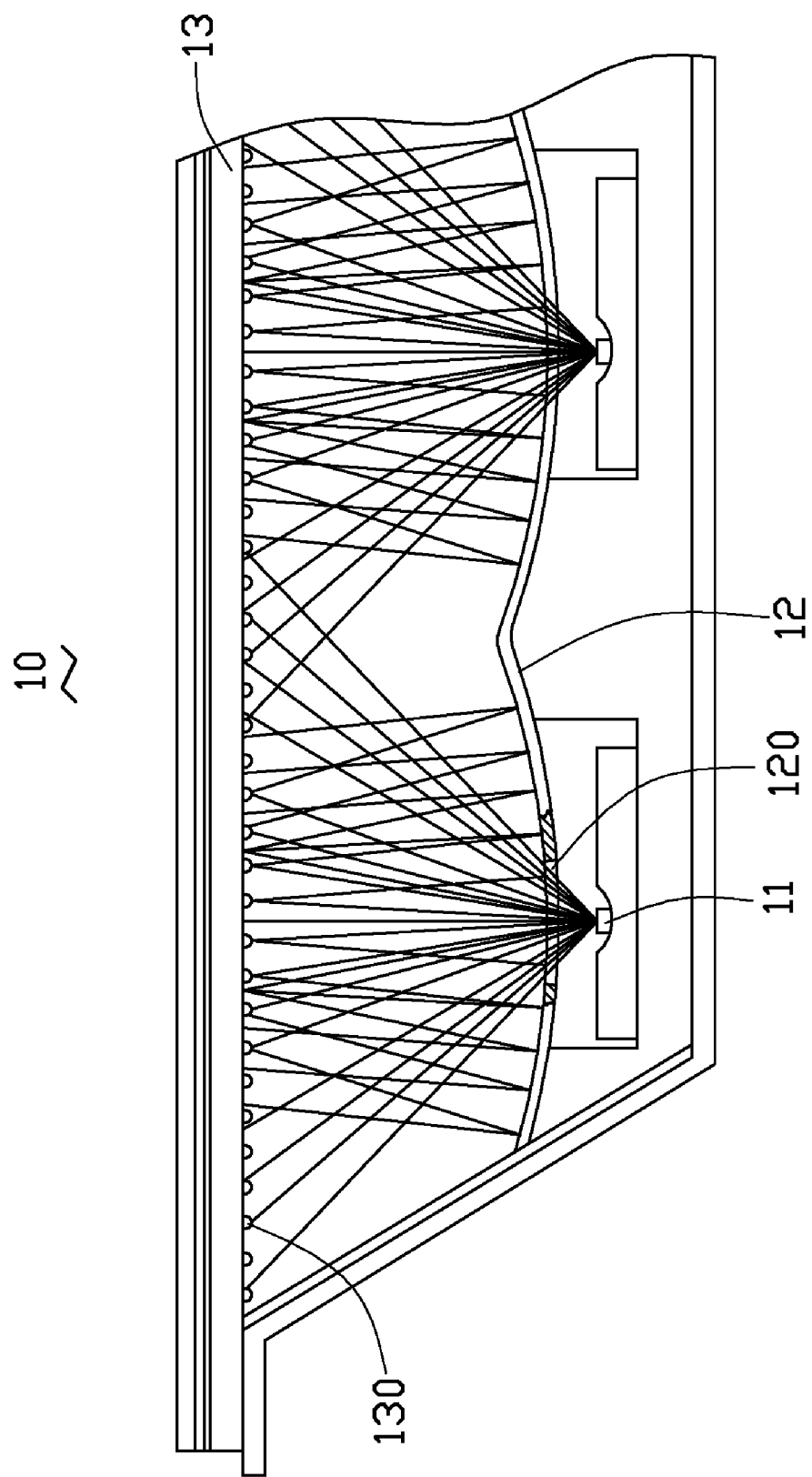
FIG. 4 is an exploded, cross-sectional view of a direct-type backlight module in accordance with a prior art.

Referring to FIG. 3, the light source 200 includes a luminescent device 228 and a focusing device 230. The luminescent device 228 is a point light source such as a fluorescent lamp or light-emitting diode (LED). In one embodiment, the luminescent device 228 is a monochromatic LED. The focusing device 230 can be made of polymethyl methacrylate (PMMA). The focusing device 230 has an output surface 2301 and a reflective surface 2302 connecting to the output surface 2301. The reflective surface 2302 is an aspherical surface. A housing 2303 opposite to the output surface 2301 is formed at the bottom of the focusing device 230. The housing 2303 can be a cavity defined in the focusing device 230 having curved located at the bottom of the focusing device 230. The luminescent device 228 is located in the housing 2303. A refractive surface 2304 is formed on the top of the housing 2303. The refractive surface 2304 is an aspherical surface. The light radiated from the luminescent device 228 enters the focusing device 230 through refraction by the refractive surface 2304. The light beams entering the focusing device 230 are reflected by the reflective surface 2302 to form parallel column-shaped light beams 232 that emit from the output surface 2301. The light beams 232 can vertically strike the bottom surface 212 of the light guide plate 202. In one embodiment, a diameter of the light beams 232 ranges from about 6 millimeters to about 8 millimeters.

The light guide plate 202 can be a transparent plate in a round, square, rectangle, polygon or other shape. The light guide plate 202 can be made of plastic, PMMA or glass. The thickness of the guide plate 202 is arbitrary, and can be selected according to need. In one embodiment, the light guide plate 202 is a square PMMA plate. The side length of the light guide plate 202 is 40 millimeters and the thickness of the light guide plate 202 is 3 millimeters.

The light guide plate 202 includes a reflector 222 located on the light output surface 214 and opposite to the center 218. The reflector 222 can be a cavity defined in the light guide plate 202. The cavity of the reflector 22 can generally be hemispherical, conical, or parabolic. In one embodiment, the cone of the reflector 22 has a vertex pointing towards the bottom surface 212. The reflector 222 has a reflective surface 224. The reflective surface 224 of the reflector 222 is configured to reflect part of the light from the corresponding light source 200 to the inside of the light guide plate 202. The light reflected into the light guide plate 202 by the reflective surface 224 can be scattered by the scattering dots 220 and get to the light output surface 214 uniformly. Thus, the uniformity of illumination of the backlight module 20 is improved. The reflective surface 224 can be coated with reflective material.

The reflective material can be selected according to desired reflective efficiency. The shape of the cavity is not limited to what is described and illustrated above. Any suitable shapes that allow the reflective surface 224 to redirect light into the light guide plate 202 may be employed. In one embodiment, the reflector 222 is conical pit. The vertex of the cone is aligned with the center 218. Diameter of the bottom surface of the cone can range from about 8.5 millimeters to about 9.2 millimeters and height of the cone ranges from about 1.4 millimeters to about 1.6 millimeters. In one embodiment, the diameter of the bottom surface of the cone is 8.8 millimeters and the height of the cone is 1.6 millimeters.

Figure 2:
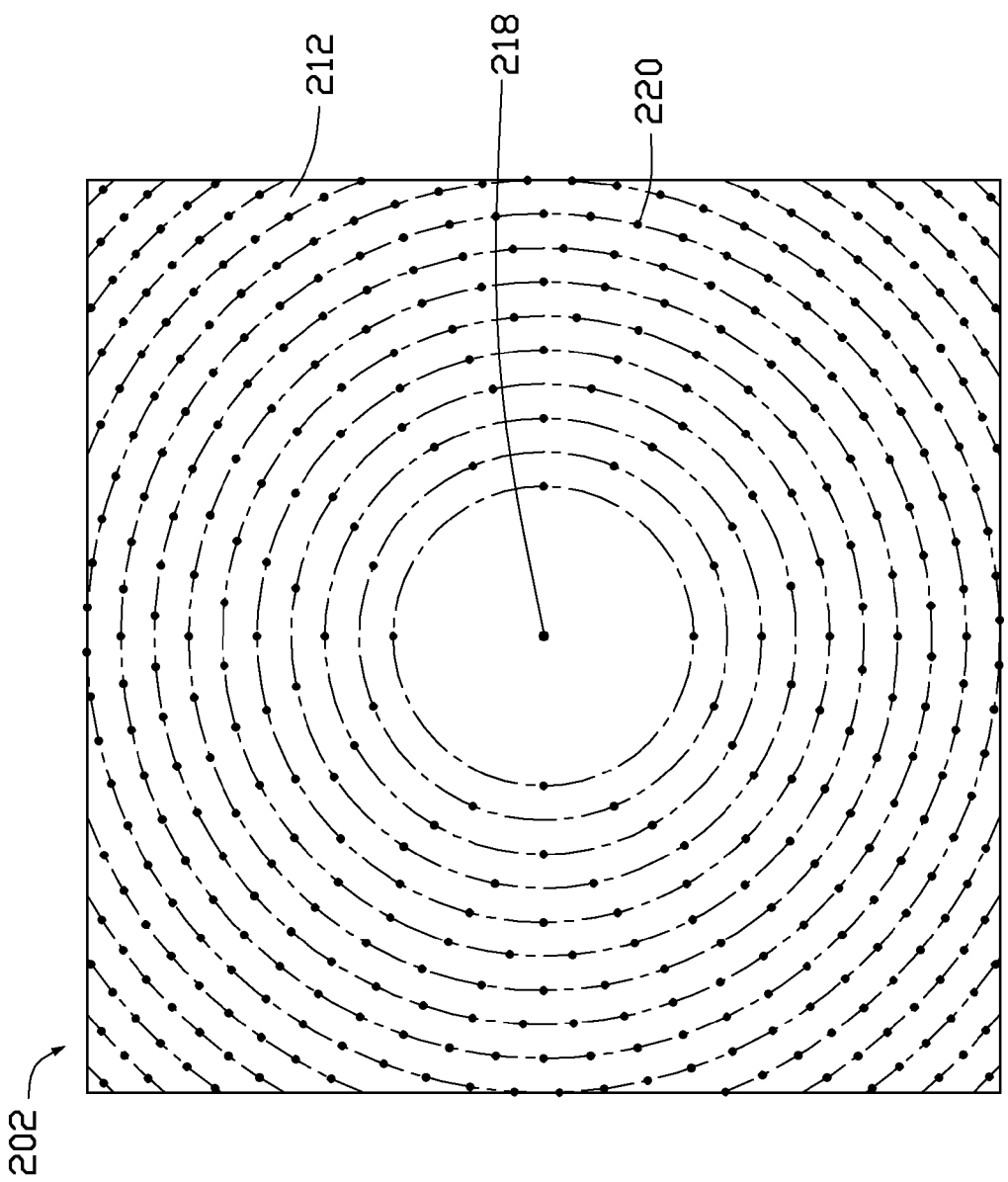
FIG. 2 is a schematic bottom view of the light guide plate of the direct-type backlight module of FIG. 1.

Referring to FIG. 2, the light guide plate 202 includes a plurality of scattering dots 220 located on the bottom surface 212 of the light guide plate 202. The scattering dots 220 can be protruding, concave or a combination thereof. The shape of the scattering dots 220 can be spherical, hemispherical, conical or a combination thereof. Effective diameters of the scattering dots 220 range from about 0.1 millimeters to about 0.5 millimeters. The scattering dots 220 can be made of ink, Ti-related materials or Si compound. In other embodiments, the scattering dots 220 are hemispherical concave dents in the light guide plate 202. A diameter of the hemispherical concave is about 0.3 millimeters. The exposed surfaces of the scattering dots 220 can be coated with highly reflective material (not shown). The scattering dots 220 are configured to scatter incident light propagating within the light guide plate 202, and thereby uniformly transmit the light to the light output surface 214 of the light guide plate 202.

The scattering dots 220 are arranged in concentric circles around the center 218. A distance between adjacent circles can be consistant or decrease further away from the center 218 to maintain a uniform light output as the intensity of light reduces away from the center 218. If the concentric circles are located equidistantly and a distance between the adjacent two circles is in a range from about 0.7 millimeters to about 1.5 millimeters, the scattering dots 220 can be located uniformly. The number of the scattering dots 220 on each circle and the radius of the circle is defined by the following formula:

$$e = |4[a1 \times (r-a2) \times (r-a3)]|$$

where, 'e' is the number of the scattering dots 220; 'r' is the radius of the circle and r≧4 millimeters; 'a1', 'a2' and 'a3' are constant, 0.05≦a1≦0.1, a2≧6, and a3≧12; [ ] means round numbers; and | | means absolute value. Because the light beams 232 radiated from the light source 200 are usually column-shaped and have a diameter in a range from about 6 millimeters to about 8 millimeters, the radius of the least circle is greater than 4 millimeters so that the light from the light source 200 can enter the light guide plate 202 directly.

In a first embodiment, a1=0.1, a2=6, a3=8, and the number of the scattering dots 220 on each circle are shown in the following table 1.

TABLE 1

| | r (mm) | | | | | | | | | | | | |
|---|---|---|---|---|---|---|---|---|---|---|---|---|---|
| | 4 | 5 | 6 | 7 | 8 | 9 | 10 | 11 | 12 | 13 | 14 | 15 | 16 |
| e | 0 | 0 | 0 | 0 | 0 | 0 | 0 | 4 | 8 | 12 | 16 | 24 | 32 |
| | r (mm) | | | | | | | | | | | | |
| | 17 | 18 | 19 | 20 | 21 | 22 | 23 | 24 | 25 | 26 | 27 | 28 | |
| e | 36 | 48 | 56 | 64 | 76 | 88 | 100 | 112 | 128 | 144 | 156 | 176 | |

As shown in table 1, when r≦10 millimeters, there is no scattering dots 220 on the area of the bottom surface 212 because the light radiated from the light source 200 is reflected by the reflector 222 and enters the light guide plate 202 to illuminate the area of the bottom surface 212 with r≦10 millimeters. When 11≦r≦20 millimeters, the scattering dots 220 on the bottom surface 212 are arranged in the form of concentric circles around the center 218 and a distance between the adjacent two circles is equal to 1 millimeter. When r≧21 millimeters, the scattering dots 220 are arranged in the form of concentric arcs on the four corners of the bottom surface 212 because the shape of the guide plate 202 is square and a distance between the adjacent two arcs is equal to 1 millimeter. The number of the scattering dots 220 on each arc can be calculated according to a length of the arc. The density of the scattering dots 220 increases further away from the center 218 so as to maintain a uniform light output as the intensity of light reduces away from the center 218.

In a second embodiment, a1=0.1, a2=6, a3=12, and the number of the scattering dots 220 on each circle are shown in the following table 2.

TABLE 2

| | r (mm) | | | | | | | | | | | | |
|---|---|---|---|---|---|---|---|---|---|---|---|---|---|
| | 4 | 5 | 6 | 7 | 8 | 9 | 10 | 11 | 12 | 13 | 14 | 15 | 16 |
| e | 4 | 0 | 0 | 0 | 0 | 0 | 0 | 0 | 0 | 0 | 4 | 8 | 16 |
| | r (mm) | | | | | | | | | | | | |
| | 17 | 18 | 19 | 20 | 21 | 22 | 23 | 24 | 25 | 26 | 27 | 28 | |
| e | 20 | 28 | 36 | 44 | 52 | 64 | 72 | 84 | 96 | 112 | 124 | 140 | |

In a third embodiment, a1=0.08, a2=10, a3=10, and the number of the scattering dots 220 on each circle are shown in the following table 3.

TABLE 3

| | r (mm) | | | | | | | | | | | | |
|---|---|---|---|---|---|---|---|---|---|---|---|---|---|
| | 4 | 5 | 6 | 7 | 8 | 9 | 10 | 11 | 12 | 13 | 14 | 15 | 16 |
| e | 8 | 8 | 4 | 0 | 0 | 0 | 0 | 0 | 0 | 0 | 4 | 8 | 8 |
| | r (mm) | | | | | | | | | | | | |
| | 17 | 18 | 19 | 20 | 21 | 22 | 23 | 24 | 25 | 26 | 27 | 28 | |
| e | 12 | 20 | 24 | 32 | 36 | 44 | 52 | 60 | 72 | 80 | 92 | 100 | |

In a fourth embodiment, a1=0.05, a2=6, a3=12, and the number of the scattering dots 220 on each circle are shown in the following table 4.

TABLE 4

| | r (mm) | | | | | | | | | | | | |
|---|---|---|---|---|---|---|---|---|---|---|---|---|---|
| | 4 | 5 | 6 | 7 | 8 | 9 | 10 | 11 | 12 | 13 | 14 | 15 | 16 |
| e | 0 | 0 | 0 | 0 | 0 | 0 | 0 | 0 | 0 | 0 | 0 | 4 | 8 |
| | r (mm) | | | | | | | | | | | | |
| | 17 | 18 | 19 | 20 | 21 | 22 | 23 | 24 | 25 | 26 | 27 | 28 | |
| e | 8 | 12 | 16 | 20 | 24 | 32 | 36 | 40 | 48 | 56 | 60 | 68 | |

The light beam reflected by the light output surface 214 and reflective surface 224 can be scattered by the scattering dots 220. Then the light beam scattered by the scattering dots 220 get to the light output surface 214 to illuminate the area of the light output surface 214 beside the reflective surface 224. Thus the uniformity of light output can be further improved.

The light guide plate 202 provided in the disclosure can be used in a backlight module having different structure with the backlight module 20.

The reflective plate 204 is located between the light source 200 and the bottom surface 212 of the light guide plate 202. The shape and the area of the reflective plate 204 are the same with that of the light guide plate 202. The thickness of the reflective plate 204 is arbitrary, and can be selected according to need. Part of the reflective plate 204 opposite to the light source 200 is transparent or hollow so that the light eradiated from the light source 200 can enter the light guide plate 202 directly. In one embodiment, part of the reflective plate 204 opposite to the light source 200 is hollow. The reflective plate 204 further includes a reflective film 226 located on the surface of the reflective plate 204 opposite to the light guide plate 202. The light striking on the bottom surface 212 of the light guide plate 202 can be reflected back into the light guide plate 202. Thus, the uniformity of illumination of the backlight module 20 can be improved.

The microprism plate 206, the polarization plate 208 and the diffusing plate 210 are located in sequence from bottom to top above the light output surface 214 of the light guide plate 202. The microprism plate 206 is configured to better focus light along desired paths. The polarization plate 208 is located between the microprism plate 206 and the diffusing plate 210. The polarization plate 208 is configured to polarize and modulate the light passing there through. The diffusing plate 210 is configured to enhance the uniformity of distribution of light that passes from the backlight module 20 to the display panel.

For enhancing reflection efficiency, the bottom surface 212 and lateral side 216 of the scattering dot 220 can be coated with highly reflective material (not shown). In addition, the backlight module 20 can further include an optical film (not shown), such as a brightness enhancement film (BEF) or a light scattering film, located above the light output surface 214. The optical film increases the brightness of a display panel (not shown) of the LCD device.

In the working process of the backlight module 20, the light radiated from the light source 200 is a column-shape light beams 232. The light beams 232 gets through the hollow part of the reflective plate 204 and enters the light guide plate 202. After the light beams 232 arrives at the reflector 222, part of the light gets out of the light guide plate 202 through the light output surface 214. At the same time, the other part of the light is reflected by the reflective surface 224 into the light guide plate 202. The light in the light guide plate 202 is reflected between the output surface 214 and the bottom surface 212 until it emmiated out of the light guide plate 202. Because the scattering dots 220 are arranged in the form of a plurality of concentric circles around the center 218 and the scattering dots 220 of each circle are uniformly located, so the light beams 232 can be scattered by the scattering dots 220 to the light output surface 214 to illuminate the area of the light output surface 214 effectively. Furthermore, the number of the scattering dots 220 of each circle satisfies the formula $e=|4[a1\times(r-a2)\times(r-a3)]|$, so the density of the scattering dots 220 increases further away from the center 218 and the light beams 232 can be scattered by the scattering dots 220 to the light output surface 214 to illuminate the area of the light output surface 214 beside the reflective surface 224. Thus, the uniformity of illumination of the backlight module 20 can be improved. The backlight module 20 can be widely employed in Liquid Crystal Displays.

Finally, it is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A light guide plate, comprising:
a body having a bottom surface having a center and a light output surface;
a reflector located on the light output surface and opposite to the center, the reflector is a cavity; and
a plurality of scattering dots located on the bottom surface, the scattering dots are arranged in the form of a plurality of concentric circles around the center, and the number of the scattering dots is defined based on a radius of the circle, the radius of the circle is greater than or substantially equal to 4 millimeter, wherein the number of the scattering dots for each concentric circle 'e' is definded by the following formula:

$$e=|4[a1\times(r-a2)\times(r-a3)]|$$

where 'r' is a radius of the circle and r≧4 millimeter; 'a1', 'a2' and 'a'' are constant, 0.05≦a1≦0.1, a2≧6, and a3≦12.

2. The light guide plate of claim 1, wherein 'a1' is about 0.1, 'a2' is about 6, and 'a3' is about 12.

3. The light guide plate of claim 1, wherein the cavity of the reflector is hemispherical, conical, or parabolic.

4. The light guide plate of claim 3, wherein a vertex of the conical cavity is aligned with the center; a diameter of a bottom of the cone ranges from about 8.5 millimeters to about 9.2 millimeters and a height of the cone ranges from about 1.4 millimeters to about 1.6 millimeters.

5. The light guide plate of claim 1, wherein distances between adjacent circles is consistent.

6. The light guide plate of claim 1, wherein a distance between two adjacent circles decreases as distance from the center increases.

7. The light guide plate of claim 1, wherein the concentric circles are located equidistantly and a distance between the adjacent two circles is in a range from about 0.7 millimeters to about 1.5 millimeters.

8. The light guide plate of claim 1, wherein the scattering dots on the same circle are uniformly dispersed.

9. The light guide plate of claim 1, wherein the scattering dots are protruding, concave or a combination thereof.

10. The light guide plate of claim 1, wherein a shape of the scattering dots is spherical, hemispherical, conical or a combination thereof.

11. The light guide plate of claim 1, wherein the exposed surfaces of the scattering dots are coated with reflective material.

12. A light guide plate, comprising:
a body having a bottom surface having a center, and a light output surface opposite to the bottom surface; and
a plurality of scattering dots located on the bottom surface, the scattering dots are arranged in the form of a plurality of concentric circles around the center, and the number of the scattering dots for each concentric circle 'e' is defined by the following formula:

$$e=|4[a1\times(r-a2)\times(r-a3)]|$$

wherein, 'e' is the number of the scattering dots; 'r' is the radius of the circle and r≧4 millimeter; 'a1', 'a2' and 'a3' are constant, 0.05≦a1≦01, a2≧6, and a3≦12.

13. A backlight module comprising:
a light source;
a body having a bottom surface having a center and a light output surface opposite to the bottom surface, the light source is located adjacent to the center of bottom surface;
a reflector located on the light output surface opposite to the center, and the reflector; and
a plurality of scattering dots located on the bottom surface, the scattering dots are arranged in the form of a plurality of concentric circles around the center, and the number of the scattering dots is defined based on a radius of the circle, and the radius of the circle is greater than or substantially equal to 4 millimeter, wherein the number of the scattering dots for each concentric circle 'e' is defined by the following formula:

$$e = |4[a1 \times (r-a2) \times (r-a3)]|$$

wherein 'r' is the radius of the circle and $r \geqq 4$ millimeter; 'a1', 'a2' and 'a3' are constant, $0.05 \leqq a1 \leqq 01$, $a2 \geqq 6$, and $a3 \leqq 12$.

14. The backlight module of claim 13, further comprising a reflective plate located between the light source and the bottom surface of the light guide plate.

15. The backlight module of claim 14, wherein the reflective plate comprises a reflective film located on a surface of the reflective plate.

16. The backlight module of claim 13, further comprising a brightness enhancement film located above the light output surface of the light guide plate.

17. The backlight module of claim 13, further comprising a microprism plate, a polarization plate and a diffusing plate.

18. The light guide plate of claim 13, wherein 'a1' is 0.1, 'a2' is 6, and 'a3' is 12.

* * * * *